United States Patent [19]
Hatch

[11] 3,813,898
[45] June 4, 1974

[54] HIGH TORQUE CRYOGENIC COUPLING

[75] Inventor: Burton D. Hatch, Ballston Lake, N.Y.

[73] Assignee: General Electric Company, Schenectady, N.Y.

[22] Filed: Jan. 2, 1973

[21] Appl. No.: 320,246

[52] U.S. Cl................. 64/15 R, 64/15 C, 64/27 C, 64/27 S, 64/13
[51] Int. Cl............................................. F16d 3/52
[58] Field of Search .... 64/15 C, 27 S, 27 CT, 27 C, 64/27 R, 13, 27 F, 15 R, 27 B; 287/86

[56] References Cited
UNITED STATES PATENTS

| | | | |
|---|---|---|---|
| 1,658,786 | 2/1928 | Ellis et al. | 64/15 R |
| 1,642,907 | 9/1927 | Sundh | 64/15 R |
| 1,264,742 | 4/1918 | Aldrich | 64/15 R |

*Primary Examiner*—Samuel Scott
*Assistant Examiner*—Randall Heald
*Attorney, Agent, or Firm*—Patrick D. Ward; Joseph T. Cohen

[57] ABSTRACT

A thermally insulated coupling for either rotatably or axially connecting a driving shaft and a driven shaft. In either application, the coupling is designed to present a high impedance to thermal heat flow between the two shafts. The present invention is applied to a basic rotatable coupling wherein a plurality of axially extending pins protruding from a flange on one shaft are mated with apertures in a flange on a second shaft. The present invention concentrically positions a spirally wound coil of metallic material between each drive pin and the wall of the corresponding aperture in which each drive pin is engaged. For application to the axial transmission of force between two axially aligned shafts, a plurality of bosses axially protruding from a flange of one shaft about the exposed edges of a corresponding plurality of metallic spiral coils which are disposed in cavities in an end flange of the second shaft.

2 Claims, 5 Drawing Figures

PATENTED JUN 4 1974 3,813,898

3,813,898

HIGH TORQUE CRYOGENIC COUPLING

BACKGROUND OF THE INVENTION

The present invention is generally concerned or related to a thermally insulated coupling between two shafts. The coupling presents a high impedance to thermal heat flow between the two shafts.

In the transmission or torque from a driving turbine to a large cryogenic, superconductive AC generator, an effectively solid coupling is required between the respective output and input shafts of the two units. The prior art has devised various coupling techniques, one of which is to couple a plurality of axially extending connecting pins on an end flange of one of the shafts with axially aligned apertures located in an end flange on the other shaft. In such an arrangement, effective transmission of torque from one shaft to the other is provided.

The problem with such prior art structures resides in the direct surface-to-surface contact between the connecting pins of one shaft and the wall surfaces of the mating apertures in the other shaft. Such direct surface-to-surface contact provides a thermal heat flow path of low impedance between the two shafts thereby prohibiting any thermal isolation of one shaft from the other. As is to be fully appreciated by those skilled in the art, the thermal isolation of any unit such as a cryogenic generator is highly desirable.

The present invention overcomes the shortcomings of the prior art by providing a coupling for effectively transmitting torque between two coupled shafts while at the same time presenting a high thermal impedance so that one shaft can be relatively isolated in a thermal sense from the other shaft to which it is coupled. The present invention further provides a structure for axially transmitting force between two shafts while thermally presenting a high impedance therebetween.

Accordingly, it is an object of the present invention to provide a torque coupling between two rotatable shafts which presents a high thermal impedance between the shafts thereby allowing each to be thermally isolated with respect to the other.

A further object of the present invention is to provide the above torque coupling which is relatively inexpensive and easy to assemble.

Another object of the present invention is to provide an axial coupling between two shafts for the axial transmission of force therebetween while enabling each shaft to remain thermally isolated with respect to the other.

SUMMARY OF THE INVENTION

The present invention provides a structure for rotatably connecting two shafts while at the same time thermally isolating one from the other. A spiral coil of metallic material is concentrically placed between each drive pin on one shaft and the side wall of each corresponding aperture in the other shaft in which each drive pin is engaged. Therefore, during rotation of the two coupled shafts, each connecting pin transmits force radially through the various layers of the spiral coil.

In such a structure, two thermal paths are presented for thermal flow between each connecting pin and surrounding aperture wall. Heat may flow radially through the coil from adjacent surface to adjacent surface or it may flow along the entire elongated spiral path of the coil. In either case, a high impedance is presented and the fact that two such paths are in parallel does not substantially decrease the thermal isolating effectiveness of the coupling.

The present invention also contemplates the transmission of force in an axial direction between two axially aligned shafts while maintaining the thermal integrity of each respective shaft. A plurality of spiral coils are disposed in mounting apertures in an exposed flange face on one of the shafts. The exposed side edges of each spiral coil is substantially flush with the flange face. A corresponding plurality of bosses protruding from a flange face of the other shaft are aligned with and abut the side edges of each spiral coil. The transmission of force takes place between the boss and the side edges of each spiral coil.

DESCRIPTION OF THE DRAWINGS

The subjet matter which is regarded as the invention is particularly pointed out and distinctly claimed in the claims set forth at the end of the specification. The invention, both as to organization and manner of use may be best understood by reference to the following description, taken in conjunction with the accompanying drawings, in which:

DESCRIPTION OF THE INVENTION

Figure 1:
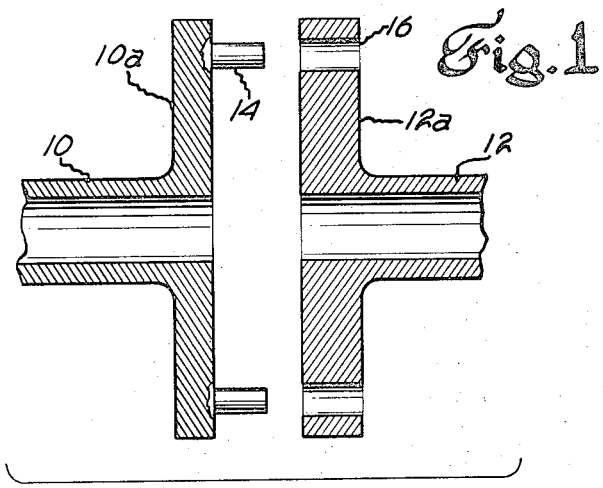
FIG. 1 is a longitudinal view in section of a coupling for the transmission of torque between the two shafts shown.

Referring to FIG. 1 of the drawings, a shaft 10 and shaft 12 are adapted to be rotatably connected. Within the scope of the present invention, either of the above shafts could be a driving shaft and the other the driven shaft and therefore for purposes of this description they are interchangeable. The present invention is utilized in such an assembly where it is desired to thermally isolate shaft 10 from shaft 12 while providing for mechanical coupling of the shafts and transmission of torque therebetween.

Each shaft includes a respective flange member shown as 10a and 12a. The flange member 10a includes a plurality of connecting pins 14 while flange member 12a includes a corresponding plurality of connecting aperture 16. Each of the connecting apertures is axially aligned with the corresponding connecting pins and receives the corresponding connecting pins when the flange members 10a and 12a are axially abutted against one another. However, if shaft 10 were the output shaft of a prime mover such as a turbine and shaft 12 were the input rotor to a cryogenic, superconductive AC generator, it is desirable to thermally isolate shafts 10 and 12 one from the other.

Figure 2:
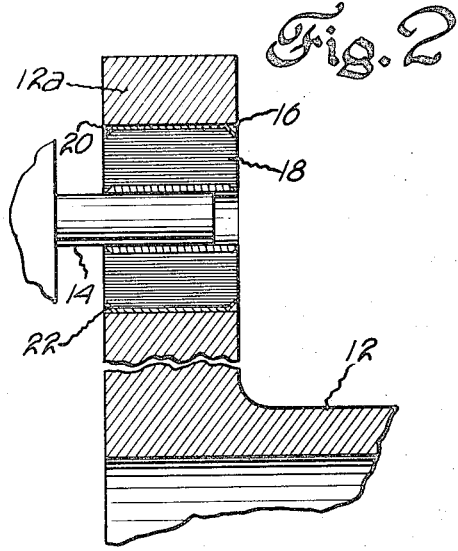
FIG. 2 is a detailed view in section of the spiral coil means.

The present invention is directed to a structure for substantially inhibiting heat flow between each connecting pin 14 and the wall of each connecting aperture 16. As seen in FIG. 2 of the drawings, a spiral coil means 18 is disposed within connecting aperture 16 and receives connecting pin 14. For facilitating assembly of the coil means 18, the coil is preassembled between outer and inner concentric bushings 20 and 22, respectively. The spiral coil means 18 is formed of metallic material such as a thin foil. The compactness and resultant rigidity of the coil in its assembled position effectively transmits torque between the connecting pin 14 and the flange member 12a.

Figure 3:
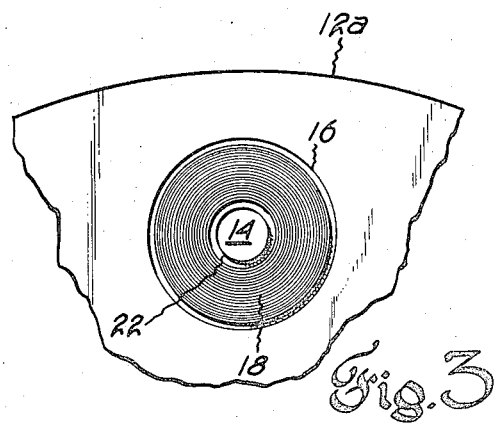
FIG. 3 is an axial end view of FIG. 2.

The spiral coil means 18 presents a high thermal impedance to potential heat flow between the connecting pin 14 and the flange member 12a. One path for thermal heat flow would be along the entire spiral path of the coil. A second parallel path for heat flow would be radially through the coil across the several adjacent contact surfaces thereof. Each of these possible heat paths in and of themselves provide very high thermal impedance and although they are in parallel, still provide the thermal impedance desired. FIG. 3 is an axial end view of the spiral coil 18 in assembled position.

The use of many layers of foil in series for the creation of thermal impedance has been considered in the prior art. Such multiple layers of material, as found in the spiral coil, present a high impedance to heat flow across the surfaces in contact by the fact that such adjacent surfaces are not in contact over their entire surface area. This is due to microscopic irregularities in the surface of the material. With respect to the present invention, this limited amount of contact area becomes smaller between two adjacent, curved surfaces.

In this regard, therefore, the coil means 18, as utilized in a mechanical coupling, substantially prevents thermal flow radially through its several layers. The present invention further contemplates embossing the surface of the spiral metal so as to present additional surface irregularities thereby further reducing interlayer contact. The present invention also contemplates the inclusion of an oxidized surface on the elongated length of the spiral coil which would effectively provide an interlacing layer between adjacent surfaces of the spiral coil. This would further reduce any heat flow which might take place. A further alternative embodiment of this latter aspect of the present invention, would be the inclusion of a separate spacing layer of material along the entire spiral length of the coil means. Such a material as plastic or glass having high thermal-insulating properties would be appropriate therefore.

In regard to the other heat flow path through the elongated length of the spiral as referred to above, the thermal impedance of a path is proportionate to the length of the path. The present invention utilizes a spiral of sufficient elongated length to provide a sufficiently high thermal impedance.

Figure 4:
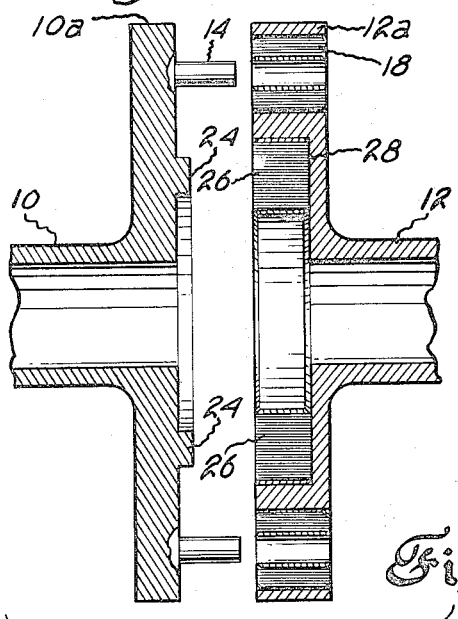
FIG. 4 is a longitudinal view in section of a coupling for the transmission of axial force between two shafts as contemplated in the present invention.

Another alternative of the present invention is shown in FIG. 4 of the drawings. FIG. 4 shows a structure for coupling two shafts 10 and 12. Axial force may be transmitted from one shaft to the other. Axial alignment and transmission of torque is effected by the connecting pin 14 and the combination of the spiral means 18 and connecting aperture 16 described above. A plurality of bosses 24 are disposed about the end face of the flange member 10a. In addition, a spiral coil means 26 is disposed within a mounting aperture 28 in the flange member 12a. The spiral coil 26 substantially occupies the entire aperture 28 so as to be rigidly maintained therein. The bosses 24 engage the lateral edges of the various layers in coil 26 and thermal heat flow is substantially inhibited between the flange member 12a and the bosses 24. As described above, the multiple-layer contact theory described above is applicable in this particular structure also.

Figure 5:
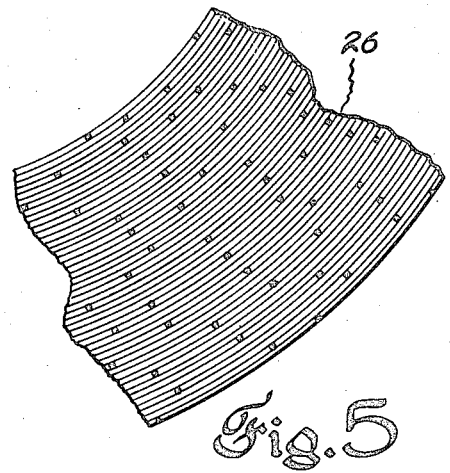
FIG. 5 is a detailed view of the spiral coil means utilized for the transmission of axial force in FIG. 4.

As shown in FIG. 5, the various layers of each spiral coil 26 can be appropriately welded together in a random fashion. In this matter, a heat flow path will not be created to any substantial degree by the spot welding while additional lateral rigidity may be imparted to the coil means 26 for receiving the axial thrust of the bosses 24.

Accordingly, although the present invention herein has been described with reference to the drawings, it is, of course, understood that various modifications may be made and it is intended to cover in the appended claims, all such modifications as fall within the true spirit and scope of the invention.

What is claimed as new and desired to be secured by Letters Patent of the United States is:

1. A thermally insulated coupling for axially connecting a driving shaft and a driven shaft, comprising:
   a first flange member,
   at least one boss, said boss being affixed to and axially protruding from said first flange member;
   a second flange member, said second flange member defining a mounting aperture;
   said mounting aperture being correspondingly positioned in axial alignment with said boss;
   a metallic, spirally wound coil means, said coil means being disposed within said mounting aperture for axially abutting said boss whereby either of said flange members is capable of transmitting axial force to the other.

2. The thermally insulated coupling according to claim 1 wherein adjacent surfaces of said coil means are spot welded together whereby increased axial rigidity is imparted to said coil means.

* * * * *